United States Patent [19]

Nakao et al.

[11] 4,385,367
[45] May 24, 1983

[54] SEQUENCE BLOCK DISPLAY SYSTEM

[75] Inventors: Hisaji Nakao, Toyota; Hideo Nishimura, Aichi; Toshihiko Yomogida; Masaharu Fujisaki, both of Kariya, all of Japan

[73] Assignee: Toyoda Koki Kabushiki Kaisha, Kariya, Japan

[21] Appl. No.: 215,373

[22] Filed: Dec. 11, 1980

[30] Foreign Application Priority Data

Jan. 16, 1980 [JP] Japan .................................. 55-3814

[51] Int. Cl.³ .............................................. G06F 3/14
[52] U.S. Cl. ................................................ 364/900
[58] Field of Search ................ 364/200, 900, 146, 147

[56] References Cited

U.S. PATENT DOCUMENTS

| 3,623,157 | 11/1971 | Stapleford | 364/900 |
| 3,964,026 | 6/1976 | Yamauchi et al. | 364/900 |
| 3,969,722 | 7/1976 | Danco et al. | 364/200 |
| 4,115,853 | 9/1978 | Dummermuth | 364/900 |
| 4,247,909 | 1/1979 | Bradley et al. | 364/900 |

Primary Examiner—Mark E. Nusbaum
Assistant Examiner—Michael R. Fleming
Attorney, Agent, or Firm—Oblon, Fisher, Spivak, McClelland & Maier

[57] ABSTRACT

A sequence block display system used with a programmable sequence controller for displaying a sequence block on a screen of a cathode-ray tube display unit in the form of ladder diagram. The sequence block display system is provided with a data processor and a buffer memory which includes first, second and third memories. The first memory is capable of storing the whole of sequence programs stored in the sequence controller and the second memory is capable of storing at least one sequence block. The third memory is adapted to store output instructions, which are used to designate a sequence block, in the same order as each designated sequence block is displayed on the screen and further to read out the output instructions in the reverse order for displaying the sequence blocks which are put out of the screen.

6 Claims, 13 Drawing Figures

| DDA ADDRESS | | |
|---|---|---|
| R | TNO | 100 |
| R+1 | TNE | 110 |
| R+2 | TNA | 130 |
| R+3 | TNA | 140 |
| R+4 | TNA | 160 |
| R+5 | YON | 200 |
| R+6 | | |

| DDA ADDRESS | | | |
|---|---|---|---|
| R | TNO | 100 | 1 |
| R+1 | TNE | 110 | 1 |
| R+2 | TNA | 130 | 1 |
| R+3 | TNA | 140 | 0 |
| R+4 | TNA | 160 | 0 |
| R+5 | YON | 200 | |
| R+6 | | | |

Fig. 6(a)

| PDS ADDRESS | | |
|---|---|---|
| P | YON | 200 |
| P+1 | | |
| P+2 | | |
| P+3 | | |
| P+4 | | |
| ⋮ | | |
| P+n | | |

Fig. 6(b)

| PDS ADDRESS | | |
|---|---|---|
| P | YON | 200 |
| P+1 | YON | 140 |
| P+2 | | |
| P+3 | | |
| P+4 | | |
| ⋮ | | |
| P+n | | |

SEQUENCE BLOCK DISPLAY SYSTEM

BACKGROUND OF THE INVENTION

1. Field of the Invention

The present invention generally relates to a sequence block display system used with a sequence controller for displaying sequence blocks on a screen of a cathode-ray tube display unit (herinafter referred to as CRT screen) in the form of ladder diagram.

2. Description of the Prior Art

The prior display system is capable of displaying on a CRT screen desired sequence blocks, each of which is made up of one output element and several input elements, and displaying at the same time the on-off state of the elements. Such a system is disclosed in U.S. Pat. No. 3,964,026. Using the prior display system, an operator can check some of the sequence blocks when a machine trouble occurs. However, it is sometimes difficult to find out the cause of the machine trouble or damaged elements by checking a few sequence blocks which have connection with a certain output element, since an input element which constitutes a sequence block may act as an output element in another sequence block and the on-off state of an input element may depend on the on-off state of other elements. Therefore, it is required to check a lot of sequence blocks one after another which have some connections with the certain output element.

However, the number of sequence blocks displayed is limited due to the size of the CRT screen and accordingly, some sequence blocks previously displayed are put out of the CRT screen when a new sequence block is displayed. Thus the operator, after checking a certain number of sequence blocks, is required to repeat the previous manipulation for display when he desires to check the erased sequence blocks again. Furthermore, the operator must memorize the memory address of the output element of the erased sequence block for subsequently displaying the same on the CRT screen. This requires a large expenditure of time and for that reason is impractical.

SUMMARY OF THE INVENTION

Accordingly, it is a primary object of the present invention to provide an improved display system which is capable of displaying sequence blocks on a CRT screen in the form of ladder diagram.

Another object of the present invention is to provide an improved display system which is capable of displaying again by a simple manipulation sequence blocks which are put out of the CRT screen in previous display operations.

Briefly, according to the present invention, these and other objects are achieved by providing a sequence block display system used with a programmable sequence controller which includes a program memory for storing a sequence program and capable of displaying a sequence block which constitutes the sequence program, as mentioned below. A data processor is connected to the programmable sequence controller. A buffer memory is connected to the data processor and has first, second and third memories. A display unit is connected to the data processor and has a screen. The data processor is capable of performing the following functions:

(1) first read out function for reading out the sequence program from the programmable sequence controller and for storing the same in the first memory.

(2) first storing function for reading out the sequence block from the first memory, wherein a sequence block is formed of one output instruction and at least one input instruction, and for reading out the on-off state of the input instruction from the programmable sequence controller to thereby store the sequence block and a discrimination signal in the second memory, wherein the discrimination signal is affirmative or negative when the on-off state satisfies or dissatisfies the input instruction respectively, (3) displaying function for displaying the sequence block on the screen in the form of ladder diagram, wherein the one output instruction and only the input instruction which has the negative discrimination signal are displayed, (4) second storing function for storing designating data in the third memory in the same order as sequence blocks designated by the designating data are displayed on the screen, (5) second read out function for reading out the designating data in the order reverse to the order from the third memory so as to display on the screen the sequence block designated by the designating data.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, wherein like reference numerals designate the same or corresponding parts throughout the several views and in which:

FIGS. 6(a) and 6(b) are explanatory views for showing the details of a push down stack PDS allocated in the buffer memory.

DETAILED DESCRIPTION OF A PREFERRED EMBODIMENT

Figure 1:
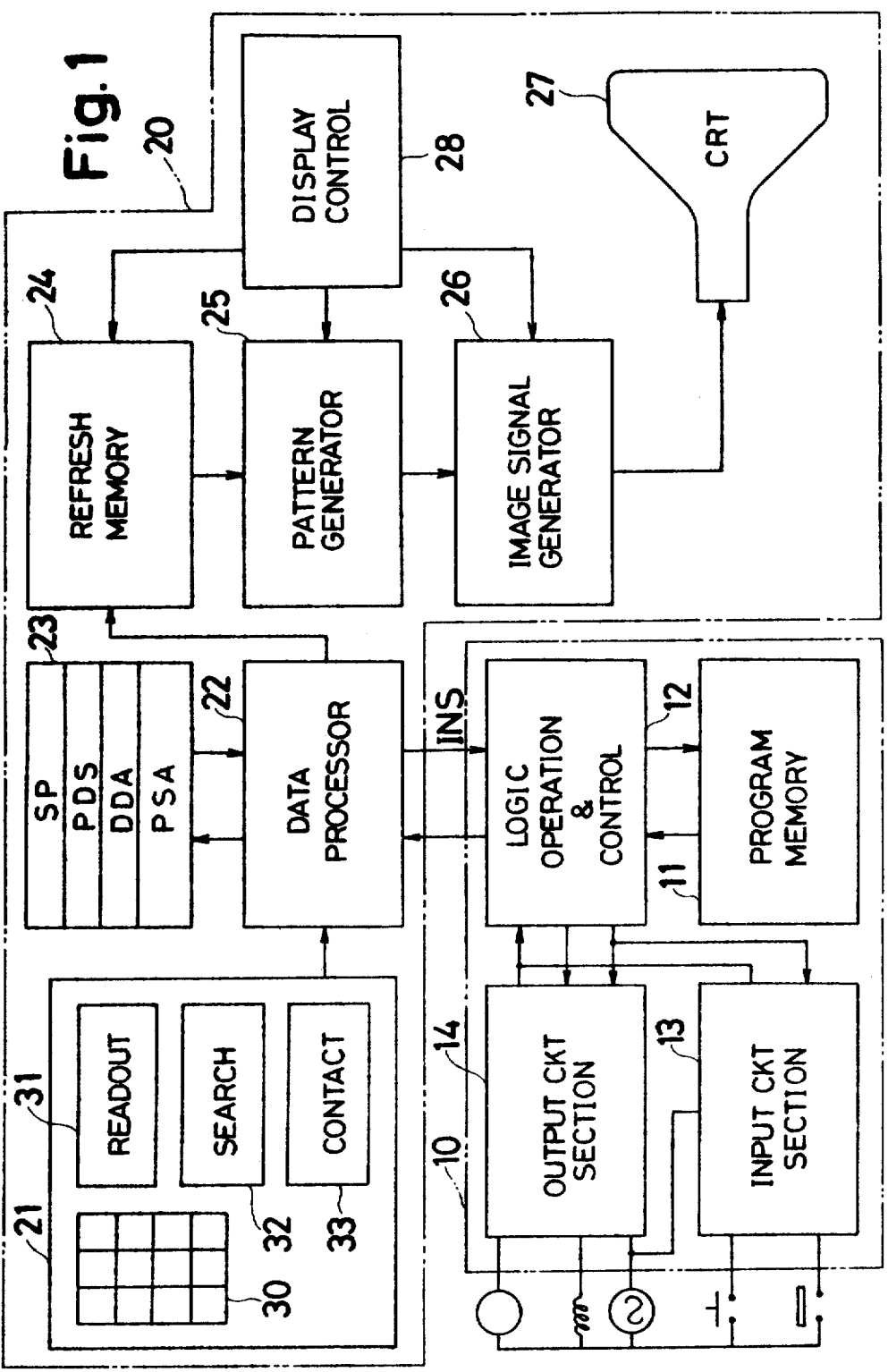
FIG. 1 is a block diagram illustrative of a conventional programmable sequence controller and a display system according to the present invention.

Referring now to the drawings and particularly to FIG. 1 thereof, a programmable sequence controller 10 is shown comprising a program memory 11, a logic operation and control section 12, an input circuit section 13, and an output circuit section 14. The memory 11 has stored therein a sequence program, which is written by the use of command words shown in the following TABLE for instructing a series of sequence control operations.

TABLE

| Command Word | Meaning |
| --- | --- |
| TNA | Test if a designated I/O element is ON and obtain a test result ANDed with a previous test result |
| TFA | Test if a designated I/O element is OFF and obtain a test result ANDed with a previous test result |
| TNO | Test if a designated I/O element is ON and obtain a test result ORed with a previous test result |
| TFO | Test if a designated I/O element is OFF and obtain a test result ORed with a previous test result |
| TNE | Test if a designated I/O element is ON, obtain a test result ORed with a previous test result, and incorporate the test result into a previous AND test result |
| TFE | Test if a designated I/O element is OFF, obtain a test result ORed with a previous test result, and incorporate the test result into a previous AND test result |
| YON | Energize a designated output element if the test result is satisfied |

In the command words, there are test commands (TNA-TFE), and an output command (YON). Each of input sequence instructions referred to later is composed of one test command and an operand containing address data for selecting an input element such as a limit switch or a relay contact. Each of output sequence instructions is composed of one output command and an operand containing address data for selecting an output element such as a relay. For example, input and output sequence instructions are such as TNO 100 and YON 200 respectively. The sequence program stored in the memory 11 is formed of a number of sequence blocks, referred to later, each of which is also composed of a plurality of sequence instructions.

The logic operation and control section 12 is operated in accordance with the sequence program stored in the memory 11, so that a series of sequence control operations are executed by repeatedly performing the tests of input and output elements connected to the input and output circuit sections 13, 14 and the energization and deenergization of the output elements based upon results of the tests. The section 12 also has the function of accepting an interrupt INS from an external device, referred to later, so as to halt the execution of the sequence control operations and to send the external device the sequence program stored in the memory 11.

Figure 2:
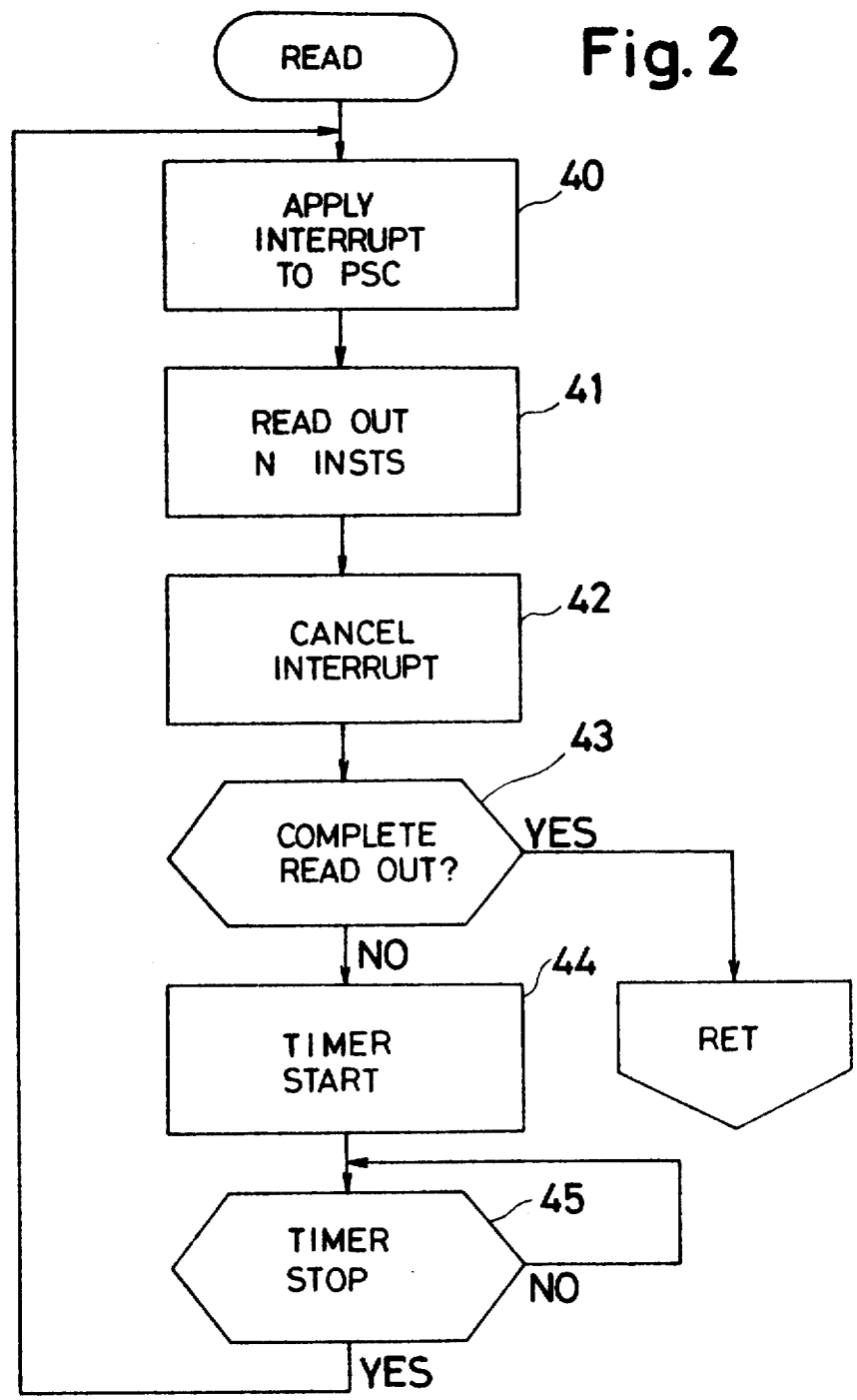
FIG. 2 is a flow chart for explaining the operations that a data processor shown in FIG. 1 performs to transfer the sequence program from the programmable sequence controller to a program storage area of a buffer memory in the display system.

As the external device, there is provided a display system 20 according to the present invention, which is arranged to display the sequence program in the form of ladder diagram on a CRT screen 27. The display system 20 is composed of a manipulation panel 21, a data processor 22, a buffer memory 23, a refresh memory 24, a pattern generator 25, an image signal generator 26, the CRT screen 27 and a display control circuit 28. The manipulation panel 21 connected to the data processor 22 comprises numeric keys 30, a read-out key 31, a search key 32 and a contact key 33. When the read-out key 31 is depressed, the data processor 22, constructed by a general purpose digital computer, repeatedly executes steps 40-45 of a read-out routine READ shown in FIG. 2 so as to repeatedly apply an interrupt signal INS to the operation and control section 12 of the controller 10. This results in storing in a program storage area PSA of the buffer memory 23 the whole of the sequence program which is stored in the program memory 11. More particularly, when the interruption signal INS is applied to the section 12 in step 40, the processor 22 is connected to the program memory 11 through the section 12 so as to read out in step 41 a predetermined number N of sequence instructions from the memory 11 and store the same in the program storage area PSA, while the operation and control section 12 halts the execution of sequence control operations until cancellation of the interruption INS in step 42. During steps 44 and 45 in which an internal timer is operated, the operation and control section 12 executes the sequence control operations to thereby avoid any inconvenience due to a period of halting the execution thereof. The steps 40-45 are repeated to complete the storage of the whole of the sequence program in the program storage area PSA.

Figure 3A:
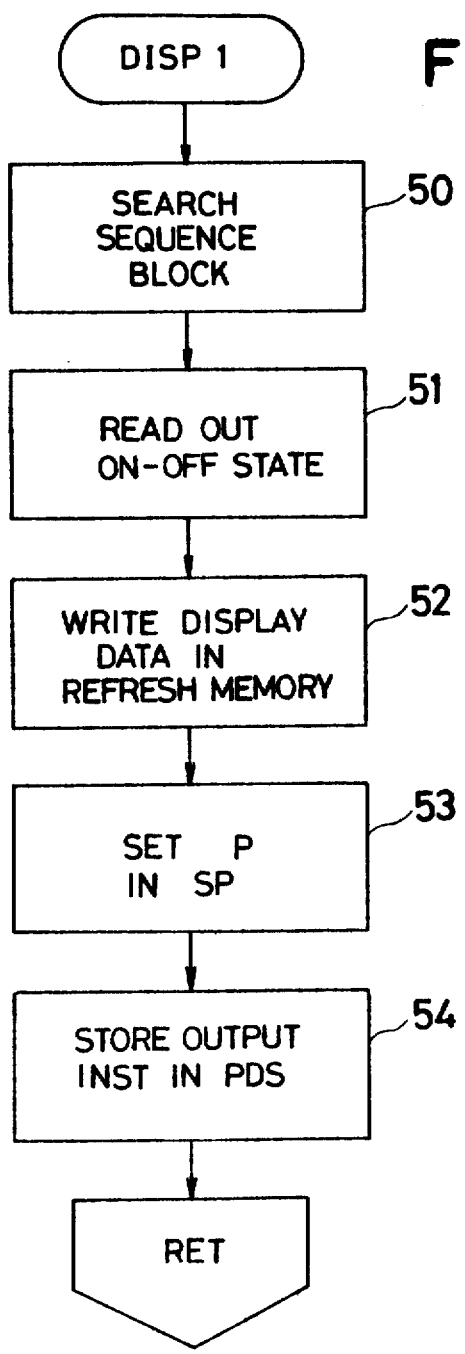
FIGS. 3(a)-3(c) are flow charts for explaining the operations that the data processor performs to display the desired sequence blocks.

Subsequently, some of the numeric keys 30 are selectively depressed for address designation of an output element that is included in a desired sequence block to be displayed and a search key 32 is then depressed for searching the desired sequence block. It is to be noted that each sequence block is made up of one output sequence instruction and at least one input sequence instruction, in other words, it includes only one output element, such as a relay, and at least one input element, such as a relay contact, which constitutes an energization circuit of the output element. The depression of the search key 32 instructs the data processor 22 to operate in accordance with a display routine DISP 1 shown in FIG. 3(a) so as to display the sequence block which includes the sequence instructions concerning the energization and deenergization of the designated output element.

Figures 4A, 4B, 4C:
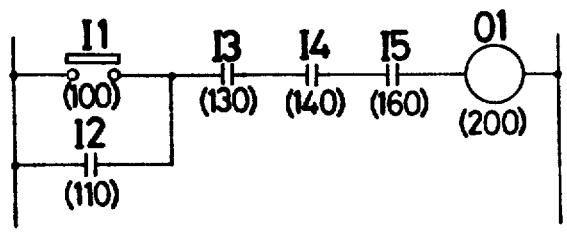
FIG. 4(a) is a ladder diagram showing an example of a relay circuit which constitues a sequence block.
FIGS. 4(b) and 4(c) are explanatory views for showing the details of a data display area DDA allocated in the buffer memory.

More specifically, the data processor 22 in step 50 of the display routine DISP 1 reads out the sequence instructions from the program storage area PSA of the buffer memory 23 one after another so as to store the read-out instructions in a data display area DDA of the buffer memory 23, as shown in FIG. 4(b). Each time when stored in the area DDA, each of the sequence instructions is ascertained as to whether it is the output instruction concerning the output element which was designated by the numeric keys 30. This ascertainment is attained by reference to the address data included in each sequence instruction just stored in the area DDA. If it is ascertained that the written sequence instruction is not addressed to the designated output element, the content of the display program storage area DDA is cleared, and the step 50 is repeated. On the other hand, if the written sequence instruction is confirmed to be addressed to the designated output element, the processing of the data processor 22 is advanced from step 50 to step 51. The data processor 22 in step 51 reads out from the programmable sequence controller 10 the on-off state of each of the input elements, corresponding to the read-out instructions, which concern the energization and deenergization of the designated output element. Depending on the on-off state of each input element, a discrimination signal 1 or 0 is also stored in the data display area DDA, as shown in FIG. 4(c). The discrimination signals 1 and 0 represent the satisfaction and the dissatisfaction with the test command of the corresponding input sequence instruction.

For example, when the operator wishes to display the sequence instructions that define a sequence circuit block shown in FIG. 4(a), he first selectively depresses some of the numeric keys 30 to designate the address 200 of a relay 01 and then depresses the search key 32. As a result, the sequence instructions that inlclude an output instruction YON 200 addressed to the relay 01 and a number of test instructions TNO 100–TNA 160 preceding the output instruction YON 200 are selected from the sequence program and are written respectively in memory addresses starting from the first address R of the data display area DDA, as shown in FIG. 4(b). After reading out on-off states of input elements I1–I5, whose addresses are 100–160, from the programmable sequence controller 10, the discrimination signals 1 and 0 are also stored in the data display area DDA, as shown in FIG. 4(c). The discrimination signals 1 and 0 represent the satisfaction and the dissatisfaction with each test command TNO-TNA respectively.

Figure 5A:
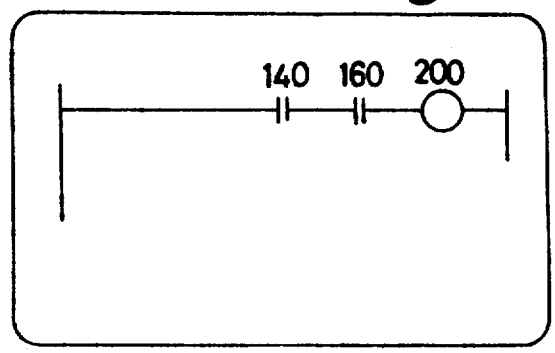
FIGS. 5(a)-5(c) are ladder diagrams displayed on a CRT screen shown in FIG. 1.

Step 52 involves converting each of the sequence instructions stored in the data display area DDA into symbol pattern designation data corresponding to each sequence instruction. The sequence instructions with the discrimination signal 0 are converted into symbol pattern designation data corresponding to each instruction, however, the sequence instructions which have the discrimination signal 1 are not converted into such symbol pattern designation data displaying the symbol of input elements, so that only sequence instructions with the discrimination signal 0 are displayed on the CRT screen as described later. The step 52 also involves storing the symbol pattern designation data in a storage area of the refresh memory 24, which storage area corresponds in address location to the area of the CRT screen where the sequence instructions from which the symbol pattern designation data derive are to be displayed in the form of ladder diagram. The display control circuit 28 instructs the refresh memory 24 to read out the pattern designation data to the pattern generator 25 at a predetermined frequency. The pattern generator 25 converts the read-out pattern designation data respectively into symbol patterns corresponding thereto and applies the symbol patterns to the image signal generating circuit 26. Consequently, a ladder diagram having a relay 01 as an output element is displayed on the CRT screen 27, as shown in FIG. 5(a). In this case, only the input instructions TNA 140 and TNA 160 are displayed along with the output instruction YON 200, since both of them have the discrimination signal 0.

In the buffer memory 23, there are further allocated a push-down stack PDS having storage addresses starting from P and a stack pointer SP for designating one of the addresses in the push down stack PDS. The data processor 22 in step 53 sets into the stack pointer SP the address number corresponding to the first address P in the push-down stack PDS so as to store in step 54 the output instruction YON 200 in the first address P as shown in FIG. 6(a).

Figure 3B:
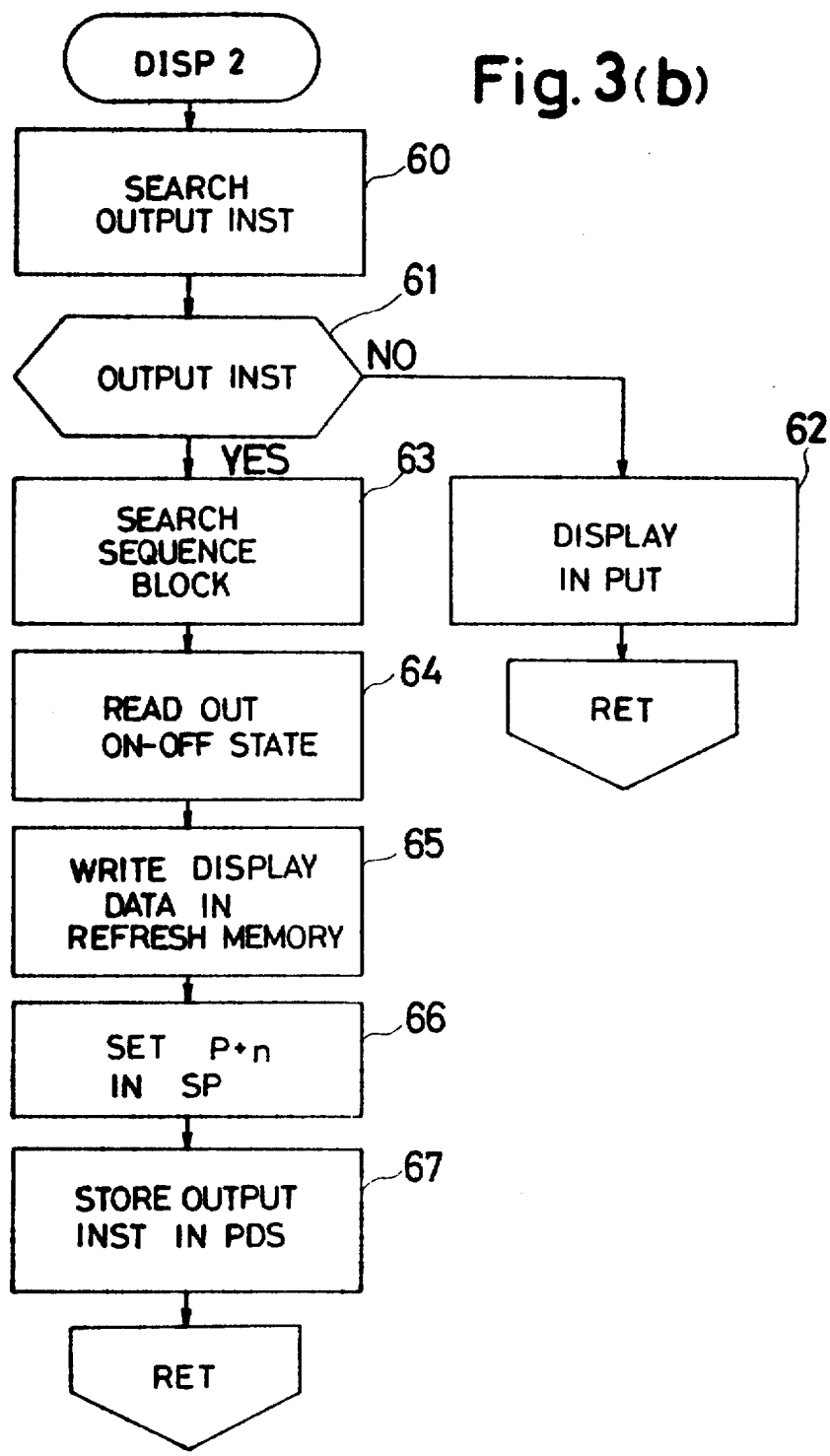

Watching the CRT screen which is displaying the sequence block, as shown in FIG. 5(a), the operator can first recognize that the input elements having the adresses 140 and 160 prevent the output element having the address 200 from being energized. Then, in order to pursue the cause of the machine trouble the operator checks as to whether there is stored an output instruction YON 140 in the program storage area PSA. More particularly, when the operator depresses some of the numeric keys 30 for designating the address 140 and then depresses the contact key 33, the data processor 22 executes steps 60–67 of a display routine DISP 2 shown in FIG. 3(b). The data processor 22 in step 60 checks as to whether the output instruction YON 140 is stored in the program storage area PSA. This ascertainment is attained by reference to the address data included in each instruction stored in the area PSA and by reference to the command word of each instruction. If it is ascertained in step 61 that there is no output instruction YON 140 is stored, step 62 is reached to display the address number 140 and the word "INPUT" on the CRT screen 27 by storing the suitable symbol pattern designation data in a storage area of the refresh memory 24. On the other hand, if the output instruction YON 140 is stored, the processing of the data processor 22 is advanced from step 61 to step 63. When step 63 is reached, a series of program instructions concerning the energization and deenergization of the designated output instruction YON 140 are read out from the area PSA so as to be stored in the area DDA. Then the data processor 22 executes steps 64 and 65 for storing the symbol pattern designation data corresponding to each instruction in the refresh memory 24 and for displaying the same on the CRT screen 27. The steps 63–65 are similar to the step 50–52 of the read-out routine DISP 1.

Figure 5B:
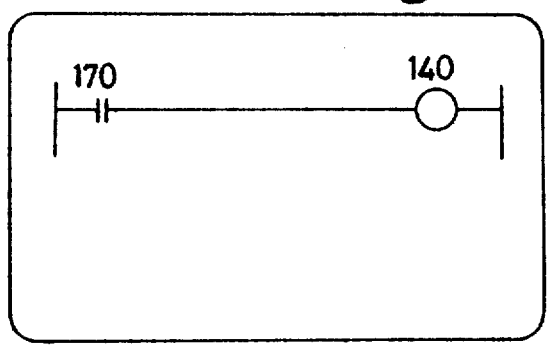

For example, if the sequence block having the output instruction YON 140 is composed of an input instruction TNA 170 and further the on-off state of the input instruction TNA 170 does not satisfy its test command TNA, the output instruction YON 140 and the input instruction TNA 170 are displayed on the CRT screen 27 in the form of ladder diagram as shown in FIG. 5(b).

In step 66, the data processor 22 sets into the stack pointer SP the address number corresponding to the next address P+1 in the push-down stack PDS so as to store in step 67 the output instruction YON 140 in the next address P+1 as shown in FIG. 6(b).

Figure 5C:
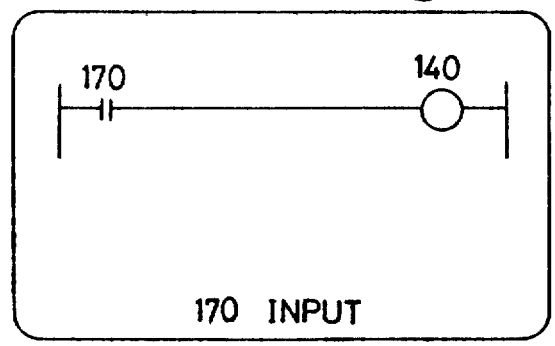

Subsequently, when the operator depresses some of the numeric keys 30 for designating the address 170 and then depresses the contact key 33 in order to pursue the cause of the machine trouble, the steps 60–67 are again executed. If there is no output instruction YON 170 stored in the area PSA, the processing of the data processor 22 is advanced from step 61 to step 62. Accordingly, the word "170 INPUT" is displayed at the lower part of the CRT screen, as shown in FIG. 5(c). Then, the operator inspects the input element having the address 170 as to whether it is the cause of the machine trouble. If the operator finds out that the input element is not the main cause, he depresses only the search key 32 without depressing the numeric keys 30.

Figure 3C:
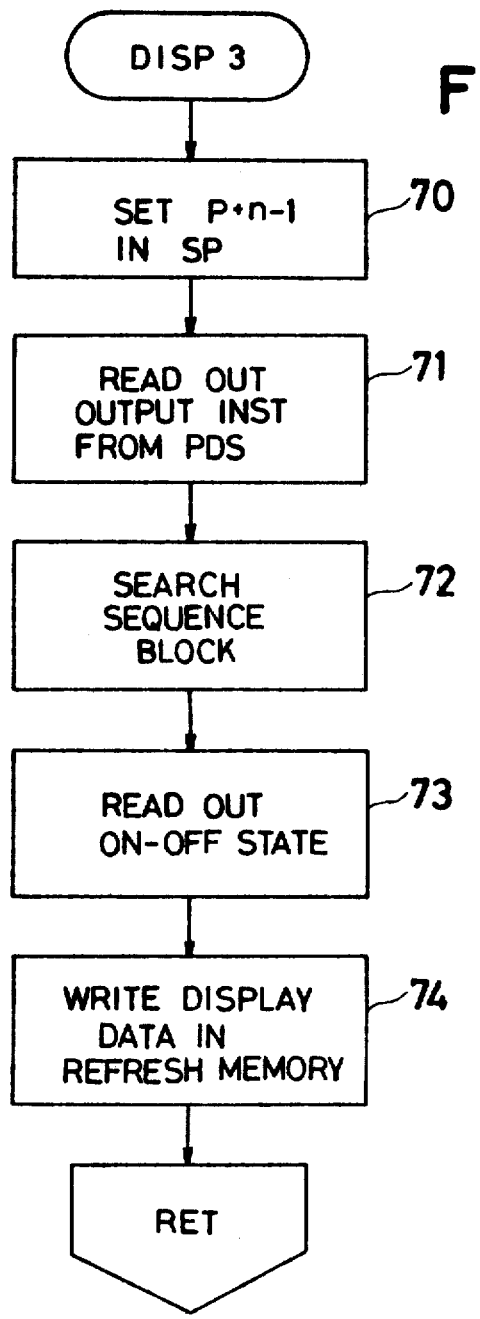

When only the search key 32 is depressed, the data processor 22 operates in accordance with a display routine DISP 3 shown in FIG. 3(c) for displaying the sequence block having the output instruction YON 200 again, executing the steps 70–74. The processor 22 in step 70 sets into the stack pointer SP the address number which corresponds to the previous address in the push-down stack PDS, that is, the address P in this case, so as to read out in step 71 the output instruction YON 200 from the area PDS. Subsequently, the processor 22 executes steps 72–74 similar to steps 50–52 for reading out the sequence block which contains the output instruction YON 200 and storing the symbol pattern designation data in the refresh memory 24 for display on the CRT screen 27.

Thus, the output instruction YON 200 which is stored in the first address P of the area PDS is read out by such a simple manipulation as to depress the search key 32 only, so that the sequence block which includes the output instruction YON 200 is again displayed on the CRT screen. Accordingly, it is possible for the operator to recognize that there is another input instruction TNA 160 which affects the energization and denergization of the output instruction YON 200. Then, in order to pursue the cause of the machine trouble, the operator depresses the numeric keys 30 to designate the instruction which has the address 160 and then depresses the contact key 33. The depression of the contact key 33 instructs the data processor 22 to execute the steps 60–67 of the display routine DISP 2. If there is an output instruction YON 160 stored in the program storage area PSA, a sequence block which includes the output instruction YON 160 is displayed on the CRT screen 27 so that the processor 22 proceeds to execute the steps 60–67 repeatedly. On the contrary, if there is no output instruction YON 160 stored in the area PSA, the word "160 INPUT" is displayed so that the operator proceeds to inspect the input element having the address 160. Afterward, when necessary, the operator instructs the data processor 22 to execute the steps 70–74 for displaying the sequence block which is put out of the CRT screen 27 in the previous displaying operations.

According to the present invention, it is possible for the operator to re-display a sequence block, which is put out of the CRT screen 27, by a simple manipulation such as only pushing the search key 32 and to find out the cause of the machine trouble quickly. This is because the output instructions, which are used to designate a sequence block, are stored at the addresses starting from P in the push-down stack PDS in the same order as each designated sequence block is displayed on the CRT screen. Further, each output instruction stored in the push-down stack PDS is read out in a reverse order for displaying the sequence block designated by an output instruction.

In the above-described particular embodiment, an output instruction is used to designate a sequence block to be displayed on the CRT screen, however, instead of an output instruction, a storage address of the program storage area PSA corresponding to the output instruction may be used to designate a sequence block. Further, in the embodiment, an output instruction is stored in the push down stack PDS to designate a sequence block, however, every input and output instruction which composes the displayed sequence block may be stored in the area PDS. Moreover, the embodiment is arranged to display only one sequence block, however, the display system according to the present invention can be applied to another type of display systems which display a plurality of sequence blocks on the CRT screen.

Obviously, numerous modifications and variations of the present invention are possible in light of the above teachings. It is therefore to be unserstood that within the scope of the appended claims, the invention may be practiced otherwise then as specifically described herein.

What is claimed is:

1. A sequence block display system used with a programmable sequence controller and capable of displaying in the form of a ladder diagram a number of program blocks constituting a sequence program, comprising:

first command input means for inputting a first search command;

address input means for inputting address data so as to selectively designate a plurality of input and output elements connected to said programmable sequence controller;

first memory means for storing said sequence program;

second memory means;

third memory means;

display circuit means having a display screen;

a data processor connected to said first command input means, said address input means, said first, second and third memory means and said display circuit means and including, first block selection means responsive to said address data from said address input means and said first search command from said first command input means for reading out from said first memory means one of said program blocks relating to one of said output elements designated by said address data so as to store said one of said program blocks in said second memory means, display instructing means responsive to any one of said program blocks being stored in said second memory means for applying to said display circuit means instruction data which enables said display circuit means to display on said display screen a ladder diagram corresponding to said any one of said program blocks being stored in said second memory means, registering means responsive to the display instruction means for registering in said third memory means designation data indicative of any one of said output elements each time any one of said program blocks relating to said any one of said output elements is displayed on said display screen so that a number of said designation data are registered in said third memory means, and second block selection means responsive to said first search command from said first command input means and said designation data being registered in said third memory means for reading out from said first memory means one of said program blocks relating to one of said designation data being registered in said third memory means so as to store said read-out one of said program blocks in said second memory means.

2. A sequence block display system as set forth in claim 1, further comprising:

second command input means for inputting a second search command; and said data processor further including, third block selection means responsive to said address data from said address input means and said second search command from said second command input means for reading out from said first memory means one of said program blocks relating to one of said output elements which in turn relates to one of said input elements designated by said address from said address input means, so as to store said readout one of said program blocks in said second memory means.

3. A sequence block display system as set forth in claim 2, wherein:

said third block selection means supplies to said display circuit means instruction data which enables said display circuit means to display on said display screen an advisory message indicating that said address data from said address input means designates one of said input elements, when said third block selection means cannot identify any one of said output elements of an address designated by said address data from said address input means.

4. A sequence block display system as set forth in claim 1, wherein said programmable sequence controller includes a program memory for storing said sequence program, further comprising:
   read-out command input means for inputting a read-out command; and
   said data processor further including:
   read-out means responsive to said read-out command from said read-out command input means for reading out said sequence program from said program memory so as to store said sequence program in said first memory means.

5. A sequence block display system as set forth in claim 1, further comprising:
   on-off state retrieving means for retrieving on-off states of a number of input elements of said input elements relating to any one of said program blocks being stored in said second memory means so as to store in said second memory means discrimination signals respectively representing said retrieved on-off states each time any one of said program blocks is stored in said second memory means, each of said discrimination signals being affirmative or negative when said on-off state of a related one of said input elements satisfies or dissatisfies an input instruction therefor, respectively; and
   said display instructing means being also responsive to said discrimination signals being stored in said second memory means for applying to said display circuit means instruction data so that any input element with which said affirmative discrimination signal is being stored in said second memory means is excluded from said ladder diagram displayed on said display screen.

6. A sequence block display system as set forth in claim 5, wherein said programmable sequence controller includes a program memory for storing said sequence program, further comprising:
   read-out command input means for inputting a read-out command; and
   said data processor further including,
   read-out means responsive to said read-out command from said read-out command input means for reading out said sequence program from said program memory so as to store said sequence program in said first memory means.

* * * * *